US008139851B2

(12) United States Patent
Kempf et al.

(10) Patent No.: US 8,139,851 B2
(45) Date of Patent: *Mar. 20, 2012

(54) SYSTEM AND METHOD FOR LOCAL VALUE ADJUSTMENT

(75) Inventors: Jeffrey M. Kempf, Allen, TX (US); David C. Hutchison, Plano, TX (US); Roger M. Ikeda, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 130 days.

This patent is subject to a terminal disclaimer.

(21) Appl. No.: 12/404,643

(22) Filed: Mar. 16, 2009

(65) Prior Publication Data

US 2009/0238448 A1 Sep. 24, 2009

Related U.S. Application Data

(62) Division of application No. 11/063,039, filed on Feb. 22, 2005, now Pat. No. 7,512,268.

(51) Int. Cl.
*G06K 9/00* (2006.01)

(52) U.S. Cl. .................................................... 382/164

(58) Field of Classification Search .................. 382/167, 382/274, 164

See application file for complete search history.

(56) References Cited

U.S. PATENT DOCUMENTS 5,808,697 A 9/1998 Fujimura et al.
5,999,279 A 12/1999 Kouzaki et al.
6,151,410 A * 11/2000 Kuwata et al. ................ 382/167
6,344,860 B1 * 2/2002 Watts ............................ 715/765
6,351,558 B1 2/2002 Kuwata
6,501,862 B1 * 12/2002 Fukuhara et al. ............. 382/249
6,650,783 B2 * 11/2003 Hamanaka .................... 382/240
6,738,527 B2 * 5/2004 Kuwata et al. ................ 382/266
6,947,594 B2 * 9/2005 Watanabe et al. ............. 382/167
7,046,252 B2 * 5/2006 Nair et al. ..................... 345/590
7,483,083 B2 * 1/2009 Li et al. ......................... 348/673
7,496,228 B2 * 2/2009 Landwehr et al. ............ 382/170
2005/0141002 A1 * 6/2005 Takano et al. .................. 358/1.9
2005/0162343 A1 * 7/2005 Kim ................................ 345/58

* cited by examiner

*Primary Examiner* — Matthew Bella
*Assistant Examiner* — Dennis Rosario
(74) *Attorney, Agent, or Firm* — Charles A. Brill; Wade J. Brady, III; Frederick J. Telecky, Jr.

(57) ABSTRACT

In accordance with the teachings of the present invention, a system and method for local value adjustment are provided. In one embodiment, the method includes identifying a hue, saturation, and brightness value for each pixel of an image, determining whether the hue and saturation for each pixel fall within a first predetermined set of hue and saturation combinations, determining whether the brightness value for each pixel of the image falls within a predetermined set of brightness values, and selectively applying a gain to the saturation of each pixel based upon the determination of whether the hue and saturation value of the pixel falls within the first predetermined set of hue and saturation combinations and the determination of whether the brightness value of the pixel falls within the predetermined set of brightness values. The method further comprises decimating the image into multiple localized regions, determining a mean brightness value for each localized region, determining whether the hue and saturation for each pixel fall within a second predetermined set of hue and saturation combinations, and selectively increasing the perceived contrast of the image around the mean brightness value for each localized region by applying a transfer function to each pixel of the image based upon the determination of whether the hue and saturation of the pixel fall within the second predetermined set of hue and saturation combinations.

8 Claims, 4 Drawing Sheets

300

SYSTEM AND METHOD FOR LOCAL VALUE ADJUSTMENT

RELATED APPLICATIONS

This application is a divisional of application Ser. No. 11/063,039, filed Feb. 22, 2005, and issued as U.S. Pat. No. 7,512,268 on May 31, 2009, and is related to U.S. patent application Ser. No. 11/062,363, titled "System and Method for Local Saturation Adjustment," filed on Feb. 22, 2005, now abandoned, and hereby incorporated by reference.

TECHNICAL FIELD

The present invention relates generally to image processing, and more particularly to a system and method for local value adjustment.

BACKGROUND

Display devices are limited in their ability to produce life-like images by their inherent contrast, the ratio between the brightest white and darkest black of the image. In the real world, brightness may vary by nine orders of magnitude. However, a display device can typically only vary the intensity of a picture element (i.e., pixel) by four orders of magnitude. Because of this disparity, it is difficult to map captured, real world intensities to displayable values. Existing methods of overcoming this disparity may address the problem by enhancing the contrast of the input image using a global transfer function, and/or increasing the saturation of the image in a uniform manner. However, these methods may increase noise, compression, or quantization artifacts in the image or result in unnatural-looking images.

SUMMARY OF THE INVENTION

In accordance with the teachings of the present invention, a system and method for local value adjustment are provided. In one embodiment, the method includes identifying a hue, saturation, and brightness value for each pixel of an image, determining whether the hue and saturation for each pixel fall within a first predetermined set of hue and saturation combinations, determining whether the brightness value for each pixel of the image falls within a predetermined set of brightness values, and selectively applying a gain to the saturation of each pixel based upon the determination of whether the hue and saturation value of the pixel falls within the first predetermined set of hue and saturation combinations and the determination of whether the brightness value of the pixel falls within the predetermined set of brightness values. The method further comprises decimating the image into multiple localized regions, determining a mean brightness value for each localized region, determining whether the hue and saturation for each pixel fall within a second predetermined set of hue and saturation combinations, and selectively increasing the perceived contrast of the image around the mean brightness value for each localized region by applying a transfer function to each pixel of the image based upon the determination of whether the hue and saturation of the pixel fall within the second predetermined set of hue and saturation combinations.

A technical advantage of some embodiments of the present invention includes the ability to locally-optimize the contrast enhancement applied to an image. Unlike many conventional contrast enhancement techniques, which employ a global transfer function, particular embodiments of the present invention employ a locally-optimized transfer function that increases the perceived contrast of an image around localized mean brightness values. These locally-optimized transfer functions may be highly implementation efficient, reducing the amount of memory required to implement the transfer functions.

Another technical advantage of some embodiments of the present invention includes the ability to selectively increase the perceived contrast of an image depending on hue and saturation. In particular embodiments, image enhancement may be turned off for selected colors, such as skin tones, so that noise and compression artifacts are not exacerbated in these colors.

Other technical advantages of the present invention may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and features and advantages thereof, reference is now made to the following description, taken in conjunction with the accompanying drawings, in which.

DETAILED DESCRIPTION OF EXAMPLE EMBODIMENTS

In accordance with a particular embodiment of the present invention, a system and method for local value adjustment are provided. Generally, the local value adjustment increases the perceived contrast or vibrancy of a displayed image by applying a locally-optimized transfer function to the brightness information of a pixel. In particular embodiments, the color information of the pixel may also be saturated. In particular embodiments, this local value and saturation adjustment may be done without impacting selected hue and saturation combinations, such as skin tones, or selected brightness values, such as darker colors. Generally, the teachings of the present invention may be applied to any image processing or video display system. Some embodiments of the present invention may be particularly useful for use in video display systems, such as those based on digital micro-mirror devices ("DMDs") and other spatial light modulators, that may have limited contrast ratios, and may be implemented through software or logic encoded into a processor, such as a digital signal processor ("DSP").

Figure 1:
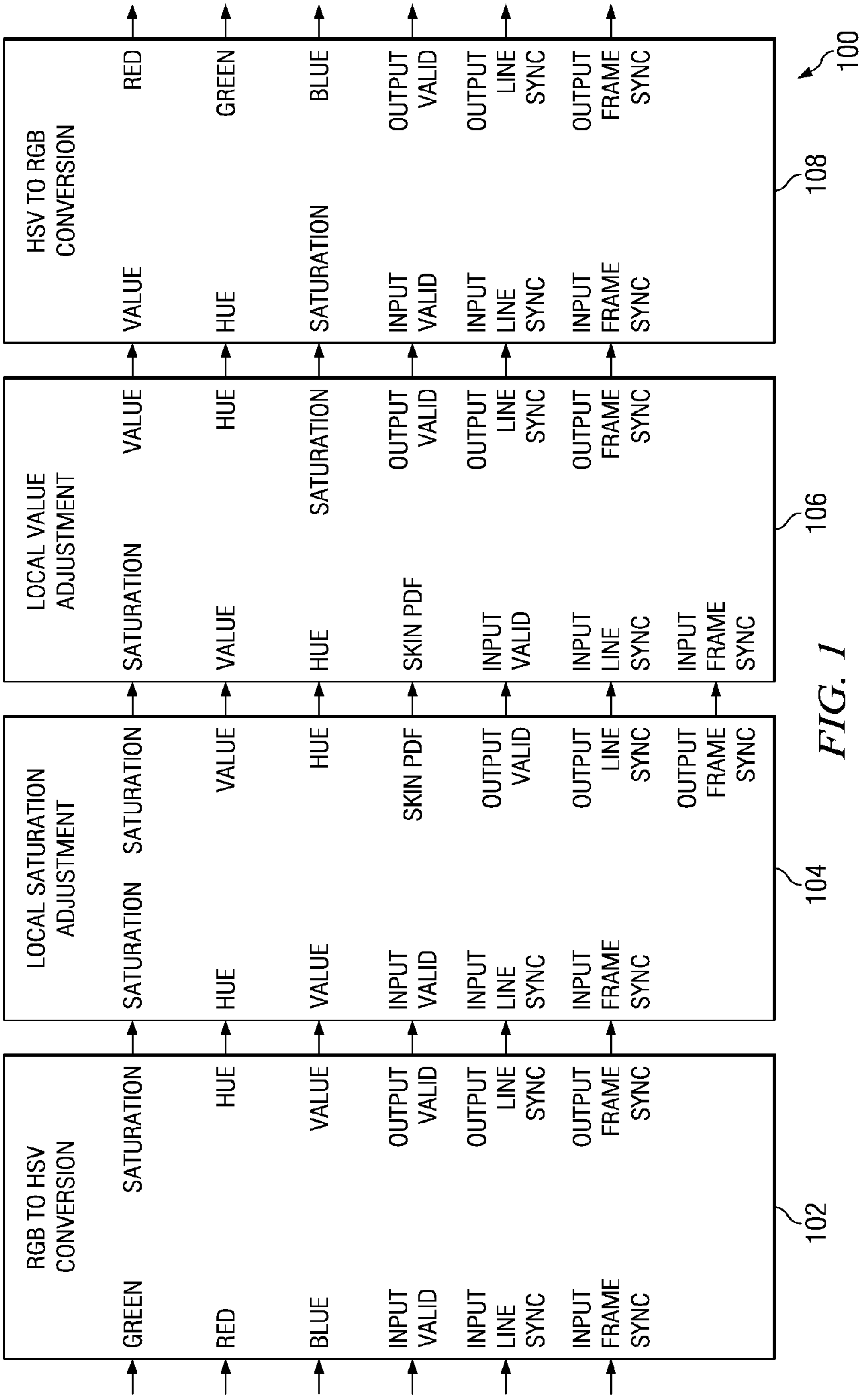
FIG. 1 illustrates a high-level block diagram of a method for intelligent contrast enhancement in accordance with a particular embodiment of the present invention.

FIG. 1 illustrates high-level block diagram 100 of an intelligent contrast enhancement method in accordance with a particular embodiment of the present invention. Generally, the image enhancement of this embodiment the present invention is performed in the Hue-Saturation-Value ("HSV") color space, in which hue defines a particular color (such as red, magenta, or yellow), saturation defines the vibrancy of the color, and value defines the brightness of the color. Therefore, the image to be enhanced must either be HSV-formatted or converted into HSV in block 102.

Generally, this conversion from a non-HSV color space into HSV may be performed using a variety of known methods which would be known to one of ordinary skill in the art. For the transition from Red-Green-Blue ("RGB"), a common format for displays, to HSV, this conversion is a non-linear process, defined by the following equations:

```
V = maximum(R,G,B)
Delta = V − minimum(R,G,B)
If (V ≠ 0)
    S = Delta/V
Else
    S = 0
End
If (Delta ≠ 0)
    If (R = V)
        H = (G − B)/Delta
    Else If (G = V)
        H = (B − R)/Delta + 2
    Else
        H = (R − G)/Delta + 4
    End
Else
    H = 0
End
```

Once the input image has been converted into the HSV color space, a local saturation adjustment ("LSA") is performed on the image in block 104 to increase the vibrancy of the image. In this process a gain is selectively applied to the saturation channel of a pixel depending on its hue and saturation. This may be particularly useful when it is desirable to vary the level of gain applied to the saturation channel of particular tones. In particular embodiments, the saturation gain applied to a pixel may also depend on the brightness of the pixel, so that compression artifacts are not exacerbated by the saturation adjustment.

Once the saturation adjustment is complete, a local value adjustment ("LVA") may be performed on the image in block 106. In this process the input image is decimated into multiple distinct regions, and a local mean brightness is determined for each of the regions. A locally optimized transfer function is then used to adjust the brightness of the pixels in each region to increase the perceived contrast by increasing the percentage of pixels at the extremes of the dynamic range. In particular embodiments, as in the local saturation adjustment, selected colors may be left unaltered by the local value adjustment so that noise and compression artifacts are not increased or accentuated by the LVA.

Finally, after the local value adjustment is complete, the enhanced image may then be converted back to its native, non-HSV format, as shown in block 108. Similar to the conversion from a non-HSV color space into HSV, this may be performed using a variety of known techniques. For particular embodiments where the non-HSV format is RGB, one method of converting from HSV to RGB is defined by the following equations.

```
I = floor(H)
F = H − I
P = V*(1 − S)
Q = V*(1 − S*F)
```

-continued

```
T = V*(1 − S*(1 − F))
If (I = 0)
    R = V
    G = T
    B = P
Else If (I = 1)
    R = Q
    G = V
    B = P
Else If (I = 2)
    R = P
    G = V
    B = T
Else If (I = 3)
    R = P
    G = Q
    B = V
Else If (I = 4)
    R = T
    G = P
    B = V
Else
    R = V
    G = P
    B = Q
End
```

Figure 2:
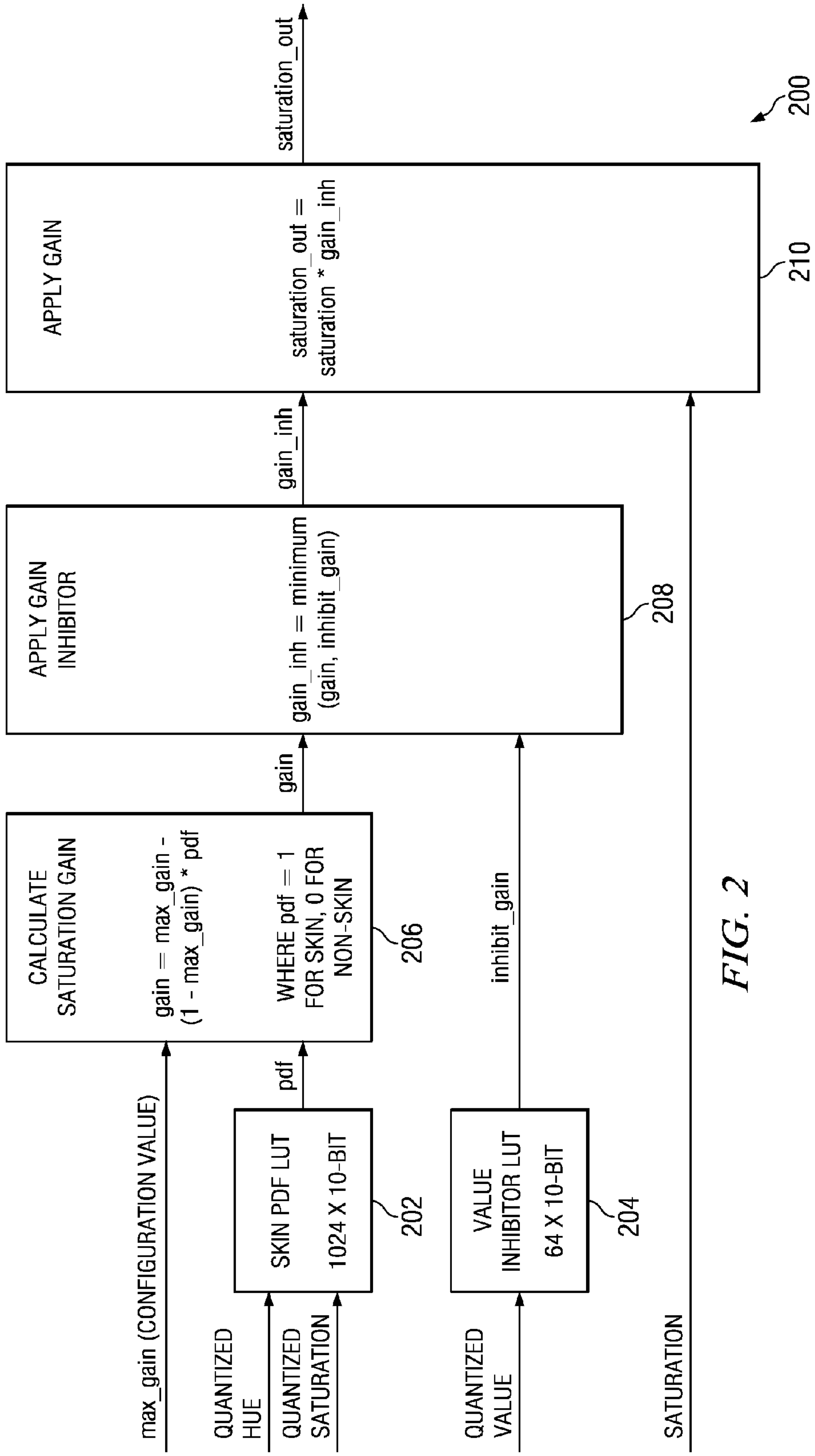
FIG. 2 illustrates a block diagram of a local saturation adjustment in accordance with a particular embodiment of the present invention.

A better understanding of the local saturation adjustment algorithm may be had by referring to FIG. 2, which illustrates flowchart 200 of a local saturation adjustment in accordance with one embodiment of the present invention. As discussed above, in particular embodiments of the present invention, the local saturation adjustment may selectively apply a gain to the saturation channel of a pixel depending on the hue and saturation of the pixel. This may be particularly useful when it is desirable to vary the level of gain applied to the saturation channel of particular tones. In particular embodiments, this selection is accomplished using a two-dimensional, hue by saturation, look-up table ("LUT") in block 202. Depending on the hue and saturation of the pixel, a probability distribution function ("PDF") indicative of whether the pixel should be included in the LSA is retrieved from the LUT. Typically, this is a binary, on or off, decision of whether to include the pixel in the LSA. However, in particular embodiments, the PDF could be selected so that the amount of gain applied to pixel could be ramped according to the hue and saturation of the pixel (i.e., the PDF could be between zero and one, rather than equal to one or zero). In this manner, selected color tones to be left unaltered by the LSA based upon their hue and saturation combinations, or may have a different amount of gain applied to them.

The ability to turn on or off processing for particular colors could be particularly useful in images portraying human beings. For example, in particular embodiments of the present invention, pixels displaying skin tones may be left unchanged, as an increase in saturation may make these pixels appear sun burnt or unnaturally vivid in appearance. Therefore, in these embodiments the 2-D LUT comprises a PDF generated from a database of 12.5 million skin tone taken from different ethnicities under different lighting conditions. An illustration of such a skin tone PDF is illustrated in FIG. 3.

Figure 3:
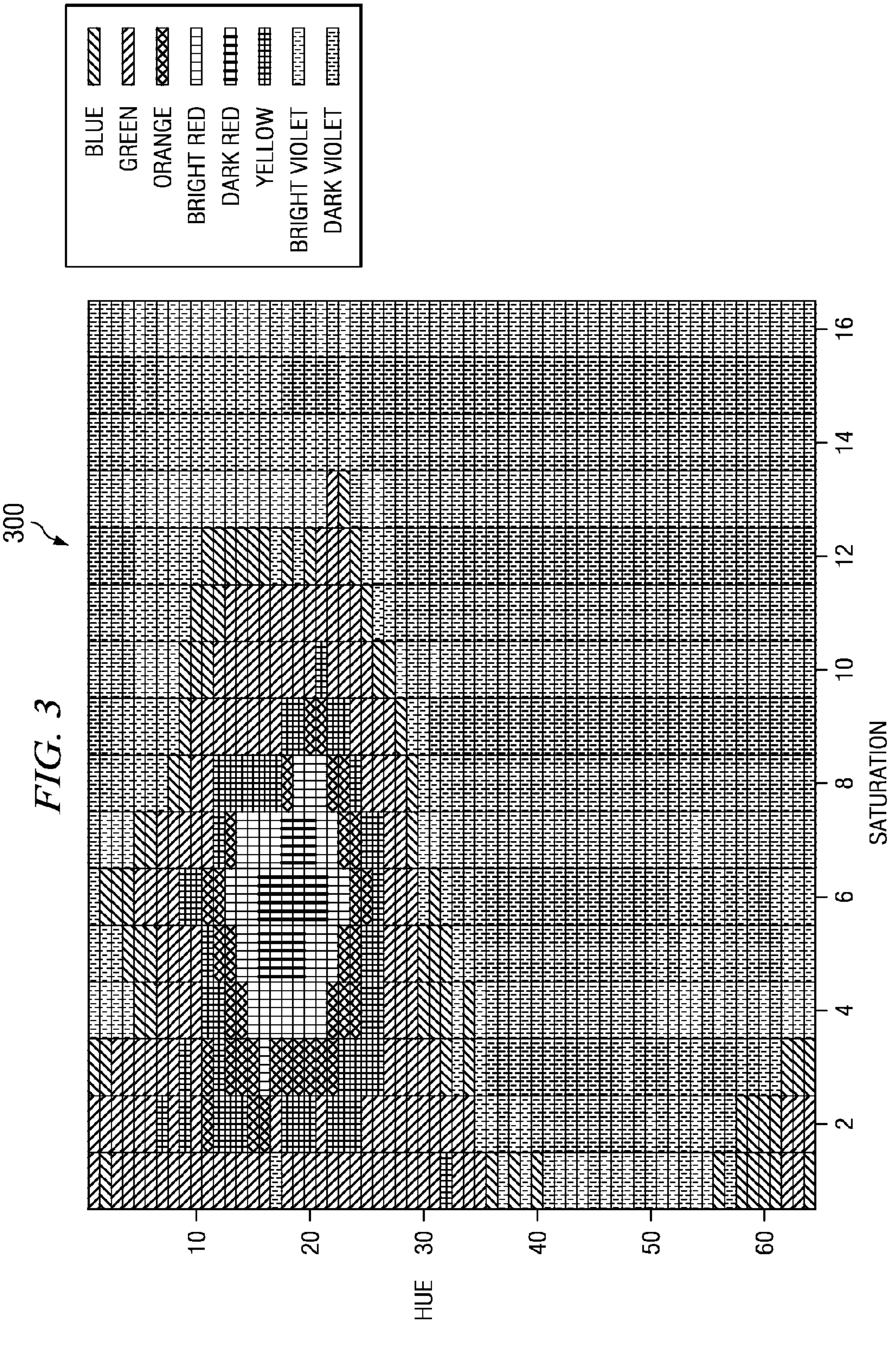
FIG. 3 illustrates a two-dimensional, hue by saturation, look-up table for use in the local saturation adjustment of particular embodiments of the present invention.

FIG. 3 illustrates PDF 300, which was generated using a database of 12.5 million skin tone taken from different ethnicities under different lighting conditions. In this example, the PDF equals one when the pixel represents a skin tones and zero when the pixel is a non-skin tone. In creating this skin tone PDF, the hue channel was quantized to 6-bits, while the saturation channel was quantized to 4-bits, resulting in a 1024

(64×16) entry LUT. Other size LUTs may be used in the accordance with the teachings of the present invention if it is determined that a different size LUT is desirable. For example, a larger LUT may help smooth the transition between skin tones and non-skin tones. Similarly, interpolation between the individual LUT entries may also be used in accordance with the teachings of the present invention. With the benefit of this disclosure, one of ordinary skill in the art should be able to select an appropriate size for the LUT given the selected application.

Referring back to FIG. 2, with the appropriate PDF value from LUT 202, the appropriate saturation gain is calculated in block 206. This may be accomplished by adjusting the maximum gain value, which is a configuration value that may be set by the user, by the appropriate PDF so that only the selected hue and saturation combinations are subjected to the saturation gain.

In addition to limiting the saturation gain applied to selected hue and saturation combinations, it may also be advantageous in particular embodiments of the present invention to limit the saturation gain applied to pixels displaying darker tones. For example, MPEG compression takes place in the YCbCr color space, in which the Y channel contains luminance information and the Cb and Cr channels contain color information. Each of these channels is compressed independently, which may introduce hue and saturation errors that may become more noticeable with decreasing luminance. Because of this, it may be beneficial to ramp on saturation gain with increasing brightness to avoid exacerbating these artifacts.

Along these lines, particular embodiments of the present invention may utilize a value inhibitor in block 204 to prevent the local saturation adjustment from exacerbating these artifacts. For this function, particular embodiments of the present invention may quantize the value channel to 6-bits and use a 64-entry LUT to prevent the application of saturation gain to dark pixels, as selected by the user. The result of this value inhibitor is then fed into block 208 where the appropriate saturation gain is determined based on the results of the value inhibitor and skin tone LUT. This appropriate gain value is then fed into block 210, where it is applied to the input saturation of the pixel.

Figure 4:
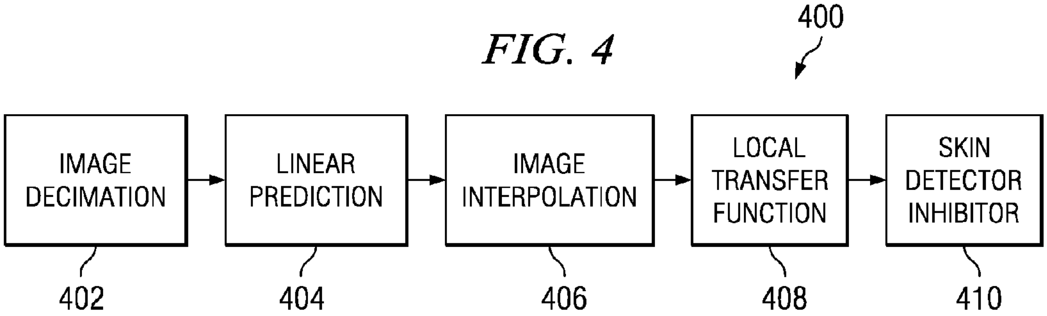
FIG. 4 illustrates a block diagram of a local value adjustment in accordance with a particular embodiment of the present invention.

As mentioned before, once the local saturation adjustment has been completed, a local value adjustment may be performed on the image. In particular embodiments, this entails applying an optimized value transfer function based on the local mean brightness. This helps to ensure that detail and perceived contrast is enhanced with minimal clipping. Typically, a sigmoid-like curve is used to improve perceived contrast by increasing the percentage of pixels at the extremes of the dynamic range. In this way, the locally-optimized approach may achieve the same level of contrast improvement as a global approach, but with increased shadow and highlight detail. FIG. 4 illustrates flowchart 400 of a particular embodiment of one such local value adjustment.

As illustrated in FIG. 4, the first step in the local value adjustment is the decimation of the input image in block 402. In this step, the input image is scaled to a significantly smaller size. For example, in particular embodiments the maximum decimated image size may be only 32 pixels by 18 lines. Although a variety of methods are available for performing this decimation, one suitable method is an implementation-efficient running-average approach. In this approach, the input image is divided into a number of distinct blocks. The sum of all values within each block is determined, and each sum is divided into the number of pixels with the corresponding block. In an embodiment employing 32 distinct blocks, only 32 counters are needed for this calculation. The size of these counters is determined by the largest supported input resolution. To resize a 1920×1080 image to 32×18, distinct blocks of 60×60 must be processed. For a 10-bit input, this would require the size of each counter to be 22 bits (1023×60×60=3682800). Therefore, 32 22-bit counters and a single divider are be needed for this process. Typically, resizing is performed with line memories, where the minimum number of line memories required is equivalent to the block size. Therefore, to perform the same decimation amount with a conventional technique would require at least 59 line memories, or 160909% more memory.

During decimation, the edges of the image may also be analyzed for the presence of black borders, which is the case for 16:9 material on a 4:3 display or vice versa. A vertical black border may be detected if more than one black line is followed by more than one non-black line (in particular embodiments, the definition of black and non-black may be determined by a user-defined threshold). Similarly, a horizontal black border may be detected if more than one black pixel is followed by more than one non-black pixel, and if this transition occurs at the same horizontal position for more than one line. To prevent the undesirable effect of emphasizing black borders, the sum for these border blocks should not be divided by the total number of pixels with the block, but by the total number of pixels that are in the non-black region of the block instead.

Using the above-described image decimation, the maximum latency of the decimation operation is 59 lines. Because of this extreme latency, it may be impractical to pipe-align the input image with the decimated results due to the memory requirements. Therefore, particular embodiments of the present invention employ previous decimated frames to predict the results of the current image decimation. In particular embodiments, a linear prediction is used, although other forms of prediction may also be used within the teachings of the present invention. Continuing the above example, to store the two previous decimated frames required for a linear prediction, 1152 (2×32×18) RAM entries are required, resulting in savings of 9833% ((59×1920×10-bits)/(1152×10-bits)) over conventional pipe alignment techniques. For a better understanding, the following equations elaborate on one linear prediction method that may be used in accordance with the teachings of the present invention.

```
Let D_n = decimated image for current frame
Let D_{n-1} = decimated image for previous frame
Let D_{n-2} = decimated image for two frames ago
Let D_{np} = predicted decimated image for current frame
D_{np} = 2*D_{n-1} - D_{n-2}
If (End of Frame)
    Update D_{n-2} with D_{n-1}
    Update D_{n-1} with D_n
End
```

Once the image has been decimated and linear-predicted, the image is then resized to the original input resolution in block 406 to obtain a localized mean for each input pixel. In particular embodiments, this interpolation may be accomplished using a polyphase filter approach. Continuing the above example, to support the interpolation of a 16×9 image to 1920×1080, 120 output samples per decimated input sample are required. This implies that a maximum of 120 phases are required for the polyphase filter implementation. When using a three-tap-per-phase filter, this makes the total filter length 360 taps (3 tap per phase×120 phases). Therefore, a 360-entry LUT is needed to store the coefficients of the interpolation filter. The equations below illustrate the process of interpolation.

```
Let x_i = horizontal position of decimated image
Let x_o = horizontal position of interpolated image
Let y_i = vertical position of decimated image
Let y_o = vertical position of interpolated image
Let D_np(x_i,y_i) = predicted decimated image for current frame
Let I(x_o,y_o) = D_np(x_i,y_i) interpolated up to the input resolution
Let n_x = number of pixels per input line
Let p_x = current phase for the horizontal filter
Let p_y = current phase for the vertical filter
Let s = scale factor (for 16 x 9 to 1920 x 1080, s = 120)
Let c = center tap position of resizing filter
p_y = 1
yi = 0
while (y_o < n_y)
    p_x = 1
    x_i = 0
    v_coeff2 = c + s/2 − p_y
    v_coeff1 = v_coeff2 − s
    v_coeff3 = v_coeff2 + s
    while (x_o < n_x)
        h_coeff2 = c + s/2 − p_x
        h_coeff1 = h_coeff2 − s
        h_coeff3 = h_coeff2 + s
        line1_filt = h_coeff1*D_np(x_i − 1, y_i − 1) +h_coeff2*D_np(x_i, y_i−1) +
                h_coeff3*D_np(x_i+1, y_i−1)
        line2_filt = h_coeff1*D_np(x_i−1, y_i) + h_coeff2*D_np(x_i,y_i) +
                h_coeff3*D_np(x_i+1,y_i)
        line3_filt = h_coeff1*D_np(x_i−1,y_i+1) + h_coeff2*D_np(x_i,y_i+1) +
                h_coeff3*D_np(x_i+1,y_i+1)
        I(x_o,y_o) = (v_coeff1*line1_filt + v_coeff2*line2_filt +
                v_coeff3*line3_filt)/2^18
        p_x = p_x + 1
            If (p_x > s)
                p_x = 1
                x_i = x_i + 1
            End
        x_o = x_o + 1
    End
    p_y = p_y + 1
        If (p_y > s)
            p_y = 1
            y_i = y_i + 1
        End
    y_o = y_o + 1
End
```

Once the image has been interpolated back to its original size, a sigmoid-like transfer function is applied to each incoming pixel based on the local mean value in block 408. A sigmoid-like curve will increase the perceived contrast around the mean, where it is assumed the majority of pixels are located. In particular embodiments, a piecewise, linear equation may used to approximate this sigmoid curve, using two user-defined parameters to define the slope for the compression and expansion regions. The constraint that the input mean is equal to the output mean may also be imposed to avoid changes in localized brightness.

Particular embodiments of the present invention may also apply a smoothing filter to the transfer function to prevent harsh discontinuities between linear segments. In particular embodiments, a binary length smoothing filter is used to eliminate the need for a divider. Generally, the maximum length of this smoothing filter may be 32, while the minimum length is determined by how close each slope transition is to the extremes of the dynamic range. For example, if the first transition occurs at gray level 5, then the length of the smoothing filter may be reduced to only 4 so that it may fit without going outside the bounds of the dynamic range. The following equations describe how each transfer function is generated in real time.

```
Let m_c = slope of compressed sections
Let m_e = slope of expanded sections
Let x_ce = transition point from m_c to m_e
Let x_ec = transition point from m_e to m_c
Let l_ce = length of smoothing filter for x_ce
Let l_ec = length of smoothing filter for x_ec
Let I(x_o,y_o) = D_np (x_i,y_i) interpolated up to the input resolution
Let N(x_o,y_o) = unaltered input
Let O(x_o,y_o) = contrast enhanced result
Let N_a = upper-most smoothing filter tap
Let N_b = lower-most smoothing filter tap
Let a_a = upper-most smoothing filter tap with transfer function applied
Let a_b = lower-most smoothing filter tap with transfer function applied
Let a_ec = x_ec with transfer function applied
Let a_ec+1 = x_ec+1 with transfer function applied
Let a_ce = x_ce with transfer function applied
Let a_ce+1 = x_ce+1 with transfer function applied
x_ce = I(x_o,y_o)*(m_e − 1)/(m_e − m_c)
x_ec = (1023 + I(x_o,y_o)*(m_e − 1) − 1023*m_c)/(m_e − m_c)
If (x_ce > 31)
    l_ce = 32
Else If (x_ce > 15)
    l_ce = 16
Else If (x_ce > 7)
    l_ce = 8
Else If (x_ce > 3)
    l_ce = 4
Else
    l_ce = 1
End
If (x_ec > 31)
    l_ec = 32
Else If (x_ec > 15)
    l_ec = 16
Else If (x_ec > 7)
    l_ec = 8
Else If (x_ec > 3)
    l_ec = 4
Else
    l_ec = 1
End
If (N(x_o,y_o) ≧ x_ec + l_ec/2)
    O(x_o,y_o) = 1023 − (1023 − N(x_o,y_o))*m_c
Else If (N(x_o,y_o) > x_ec − l_ec/2)
    N_b = N(x_o,y_o) − l_ec/2
    N_a = N(x_o,y_o) + l_ec/2
    a_b = m_e*(N_b − I(x_o,y_o)) + I(x_o,y_o)
    a_a = 1023 − (1023 − N_a)*m_c
    a_ec+1 = 1023 − (1023 − (x_ec + 1))*m_c
    a_ec = m_e*(x_ec − I(x_o,y_o)) + I(x_o,y_o)
    O(x_o,y_o) = [½(a_b + a_ec)(x_ec − N_b) + ½(a_a + a_ec+1)(N_a − x_ec + 1)]/l_ec
Else If (N(x_o,y_o) ≧ x_ce + l_ce/2)
    O(x_o,y_o) = m_e*(N(x_o,y_o) − I(x_o,y_o)) + I(x_o,y_o)
Else If (N(x_o,y_o) > x_ce − l_ce/2)
    N_b = N(x_o,y_o) − l_ce/2
    N_a = N(x_o,y_o) + l_ce/2
    a_a = m_e *(N_a − I(x_o,y_o)) + I(x_o,y_o)
    a_b = m_c*N_b
    a_ec+1 = m_e*(x_ce + 1 − I(x_o,y_o)) + I(x_o,y_o)
    a_ce = m_c*x_ce
    O(x_o,y_o) = [½(a_b + a_ce)(x_ce − N_b) + ½(a_a + a_ec+1)(N_a − x_ce + 1)]/l_ce
Else
    O(x_o,y_o) = m_c*N(x_o,y_o)
End
```

Figure 5:
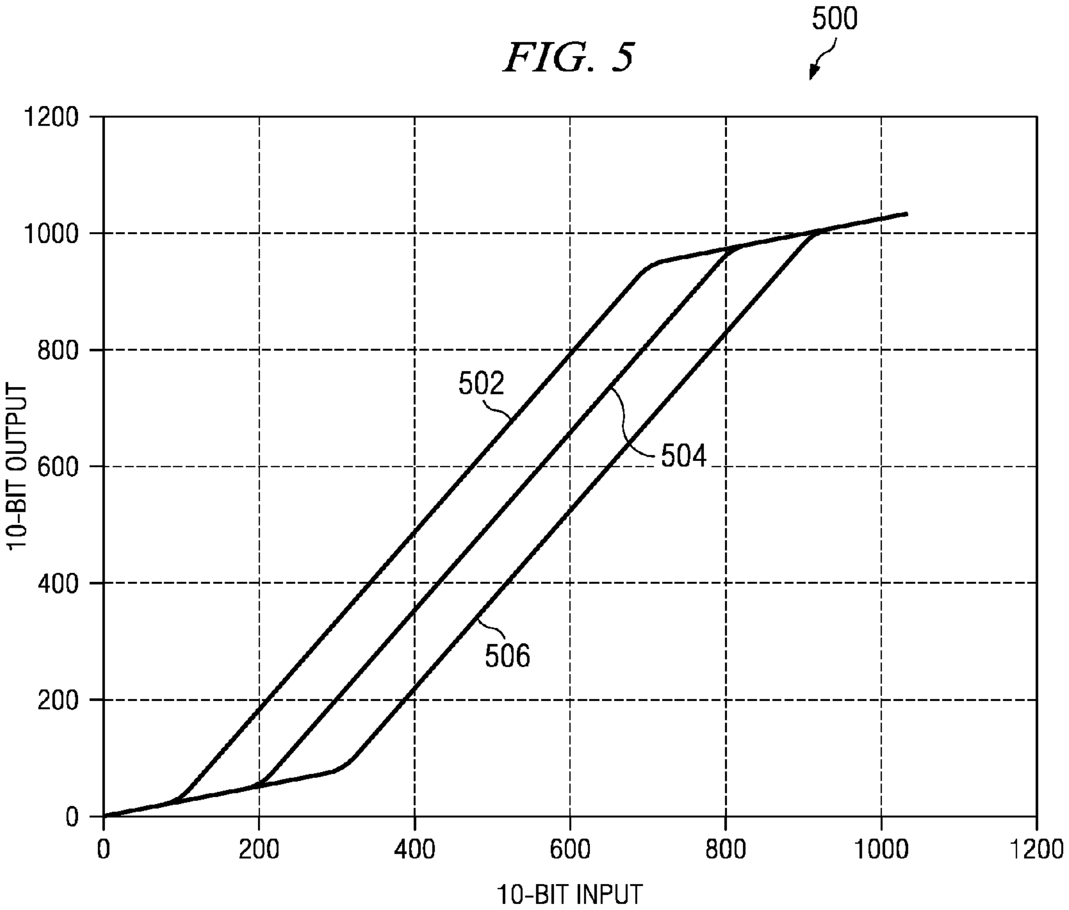
FIG. 5 illustrates three sigmoid-like transfer functions for use in a particular embodiment of the present invention.

Three different local transfer functions generated using this methodology are illustrated in FIG. 5, in which curves 502, 504, and 506 correspond to local mean values of 256, 512, and 768, respectively.

Referring back to FIG. 4, once the local transfer function has been generated, particular embodiments of the present invention selectively apply the transfer function to the pixels of the input image. As before in the local saturation adjustment, it may be advantageous to leave particular colors, such as skin tones, unaffected by the local value adjustment. In the case of skin tones, this is due to the fact that the local value adjustment might exacerbate noise and/or compression artifacts in faces. Therefore, a skin detector inhibitor is employed in block 410 to reduce or eliminate the affect of the local value adjustment on skin tones or other selected colors.

Generally, the skin detector inhibitor employs a PDF LUT to determine which colors to include in the local value adjustment. For the case of skin tones, a skin tone PDF similar to PDF 300, shown in FIG. 3 and discussed previously, may be used to prevent the localized value adjustment of skin tones. In fact, in particular embodiments the same skin tone PDF used in the local saturation adjustment may also be used in the local value adjustment. One embodiment of how such a skin detector inhibitor may be applied is described by the follow equation:

Let pdf=probability distribution function of skin, $0 \leqq \text{pdf} \leqq 1$

Let $O_i(x_o,y_o)=O(x_o,y_o)$ adjusted for skin tones $$O_i(x_o,y_o)=(1-\text{pdf})*O(x_o,y_o)+\text{pdf}*N(x_o,y_o)$$

Once the skin detector inhibitor is finished with the input image, the intelligent contrast enhancement algorithm is complete, and the enhanced image may be converted back to its native format, as discussed before.

By employing a locally optimized transfer function, particular embodiments of the present invention may enhance detail and perceived contrast, while minimizing clipping. Furthermore, the implementation-efficient local transfer functions employed by particular embodiments of the present invention help to reduce the memory required to process the input image, while the skin detector inhibitor prevents the application of the local transfer function to selected colors.

Additionally, the locally adaptive saturation adjustment employed by particular embodiments of the present invention provide further improvements to vibrancy without negatively affecting skin tones or other selected colors. This prevents the selected colors from appear sun-burnt or unnaturally vivid in appearance. Furthermore, by selectively applying the saturation adjustment to pixels of selected brightnesses, particular embodiments of the present also prevent or minimize the exacerbation of compression artifacts in dark regions of the input image.

Although particular embodiments of the method and apparatus of the present invention have been illustrated in the accompanying drawings and described in the foregoing detailed description, it will be understood that the invention is not limited to the embodiments disclosed, but is capable of numerous rearrangements, modifications, and substitutions without departing from the spirit of the invention as set forth and defined by the following claims.

What is claimed is:

1. A method for local value adjustment, comprising:

identifying a hue and saturation for each pixel of an image;

determining whether the hue and saturation for each pixel fall within a predetermined set of hue and saturation combinations; and selectively increasing a perceived contrast of the image around a mean brightness for a localized region by applying a transfer function to each pixel of the image based upon the determination of whether the hue and saturation of the pixel fall within the predetermined set of hue and saturation combinations.

2. The method of claim 1, wherein selectively increasing the perceived contrast of the image around the mean brightness for the localized region comprises applying a sigmoid-like transfer function to each pixel of the image.

3. The method of claim 1, further comprising:

converting the image from a non-HSV color space to a HSV color space prior to determining a mean brightness for each localized region.

4. The method of claim 1, further comprising:

converting the image from a HSV color space to a non-HSV color space after selectively increasing the perceived contrast of the image.

5. The method of claim 1, further comprising decimating an image to determine a local mean brightness for a plurality of regions, wherein the local mean brightness is the mean brightness for a corresponding localized region.

6. The method of claim 1, further comprising decimating an image to determine a local mean brightness for a plurality of regions, wherein the local mean brightness for a previous image is the mean brightness for a corresponding localized region.

7. The method of claim 1, further comprising decimating an image to determine a local mean brightness for a plurality of regions, wherein the mean brightness for a localized region is determined by interpolation from the local mean brightness.

8. The method of claim 1, further comprising decimating an image to determine a local mean brightness for a plurality of regions, wherein the mean brightness for a localized region is determined by interpolation from the local mean brightness of a previous image.

* * * * *